United States Patent [19]

Moritomo et al.

[11] 4,118,900
[45] Oct. 10, 1978

[54] METHOD FOR CONTROLLING GRINDING PROCESS

[75] Inventors: Sadao Moritomo; Youji Tatsumi; Terumitsu Sugita, all of Narashino, Japan

[73] Assignee: Seiko Seiki Kabushiki Kaisha, Japan

[21] Appl. No.: 779,999

[22] Filed: Mar. 22, 1977

[30] Foreign Application Priority Data

Mar. 29, 1976 [JP] Japan .................................. 51-34804
Mar. 29, 1976 [JP] Japan .................................. 51-34805

[51] Int. Cl.² .............................................. B24B 1/00
[52] U.S. Cl. .............................. 51/281 R; 51/165.77; 51/165.87; 51/327
[58] Field of Search ......... 51/134.5 R, 165 R, 165.77, 51/165.87, 281, 327

[56] References Cited

U.S. PATENT DOCUMENTS

| | | | |
|---|---|---|---|
| 3,178,861 | 4/1965 | Milias | 51/134.5 R |
| 3,581,445 | 6/1971 | Price | 51/134.5 R |
| 3,798,846 | 3/1974 | Smith | 51/134.5 R |
| 3,913,277 | 10/1975 | Hahn | 51/165.87 |

Primary Examiner—Harold D. Whitehead
Attorney, Agent, or Firm—Robert E. Burns; Emmanuel J. Lobato; Bruce L. Adams

[57] ABSTRACT

In a grinding machine, either the revolutional speed of the workpiece or of the grinding wheel is controlled and further the infeed speed of the wheel to the workpiece is controlled so that the optimum grinding condition, having a suitable ratio of the workpiece surface speed to the grinding wheel surface speed and a suitable ratio of the infeed speed to the workpiece revolutional speed, is obtained. The former ratio is maintained despite the wheel diameter decrease caused by wheel dressings.

4 Claims, 3 Drawing Figures

METHOD FOR CONTROLLING GRINDING PROCESS

BACKGROUND OF THE INVENTION

This invention relates to a controlling method for a grinding process.

In a grinding process, the speed ratio $K_v$ (workpiece surface speed/grinding wheel surface speed) and infeed amount per one workpiece revolution $\Delta$ (infeed speed per minute/workpiece revolution per minute) have influence on grinding accuracy and efficiency. For obtaining both high grinding accuracy and high grinding efficiency, it is advantageous that rough grinding is performed under a condition in which the infeed amount $\Delta$ is higher so that the ground surface of the workpiece is rather rough but good metal removal with high grinding ability is maintained so as to improve roundness and cylindricity of the workpiece, and that fine grinding is performed in a condition in which the infeed amount $\Delta$ is lower so that grinding efficiency is rather poor but surface roughness of the workpiece is improved.

Further, revolution speeds of the workpiece and the grinding wheel, and infeed speed should be controlled to keep optimum $K_v$ and $\Delta$.

In conventional grinding methods, revolution speeds of the workpiece and the grinding wheel, and infeed speed in rough or fine grinding step are respectively kept constant. Accordingly, the speed ratio $K_v$ is approximately constant and is not always suitable for rough grinding or fine grinding. Good surface roughness of the workpiece cannot be attained, in the prior art, without long time spark-out after fine grinding, in the spark-out metal removal rate diminishing as time passes, because the revolution speed of the workpiece in fine grinding is the same as that in rough grinding and is not suitable for improving surface roughness of the workpiece. Moreover, this surface roughness improving method with longer spark-out cannot effect constant quality on the workpiece surface as the grinding ability of the wheel or other factors sometimes changes the surface roughness.

The grinding wheel becomes smaller in the diameter after several dressings, shifting $K_v$ and $\Delta$ to unsuitable values during rough and fine grinding which deteriorates grinding accuracy and efficiency.

SUMMARY OF THE INVENTION

Therefore, it is an object of the present invention to provide a controlling method for a grinding process in which high grinding accuracy and high grinding efficiency are always kept over long working operation.

It is another object of the invention to provide a controlling method for a grinding process in which speed ratio $K_v$ of the workpiece surface speed to the grinding wheel surface speed and infeed amount per workpiece revolution $\Delta$ are so selected as to be suitable for roundness and cylindricity improvement in a rough grinding step and as to be suitable for surface roughness improvement in a fine grinding step respectively.

It is still another object of the invention to provide a controlling method for a grinding process in which the effect of the grinding wheel diameter decreasing due to its dressings is cancelled with controlling workpiece revolution speed, grinding wheel revolution speed and/or infeed speed.

With the method of the invention, larger $K_v$ and $\Delta$ are applied to the rough grinding step bringing higher grinding condition for obtaining a high rate of metal removal and geometrical accuracy such as roundness, cylindricity and size, while smaller ones are applied to the fine or finish grinding step bringing polishing condition for obtaining finer surface roughness.

DETAILED DESCRIPTION OF THE PREFERRED EMBODIMENT

Figure 1:
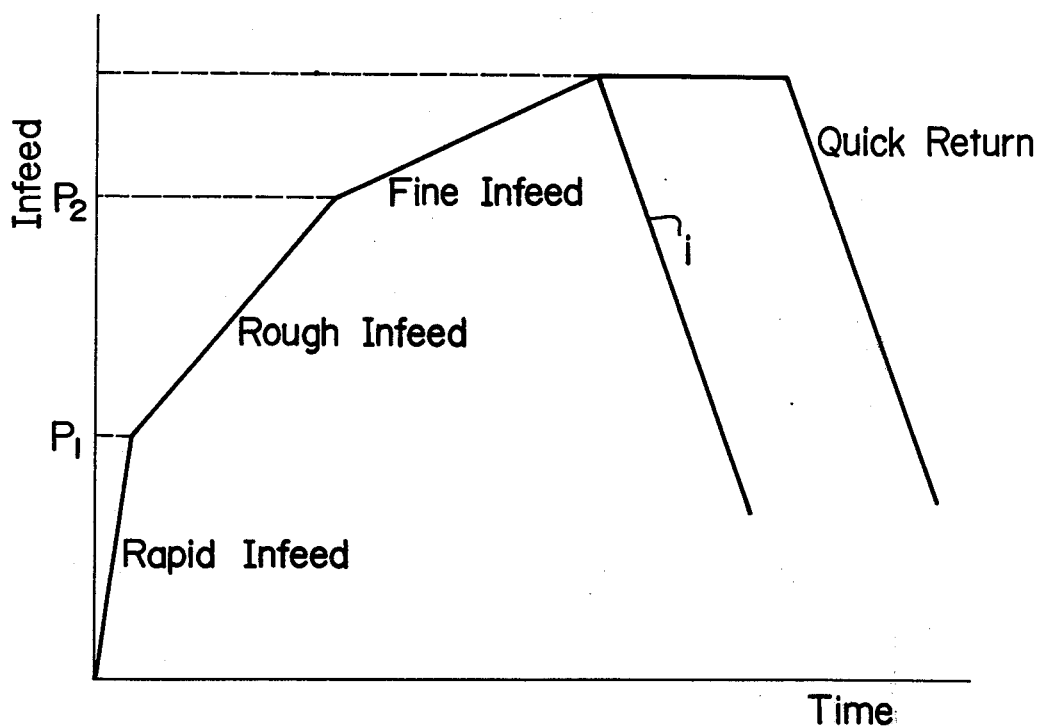
FIG. 1 is a timing diagram showing an infeed-time relation of a grinding process to which this invention is available.

The preferred embodiments of the Invention will now be described referring to the attached drawings, in which FIG. 1 shows an infeed-time diagram of the grinding process using a controlling method of the invention.

Figure 2:
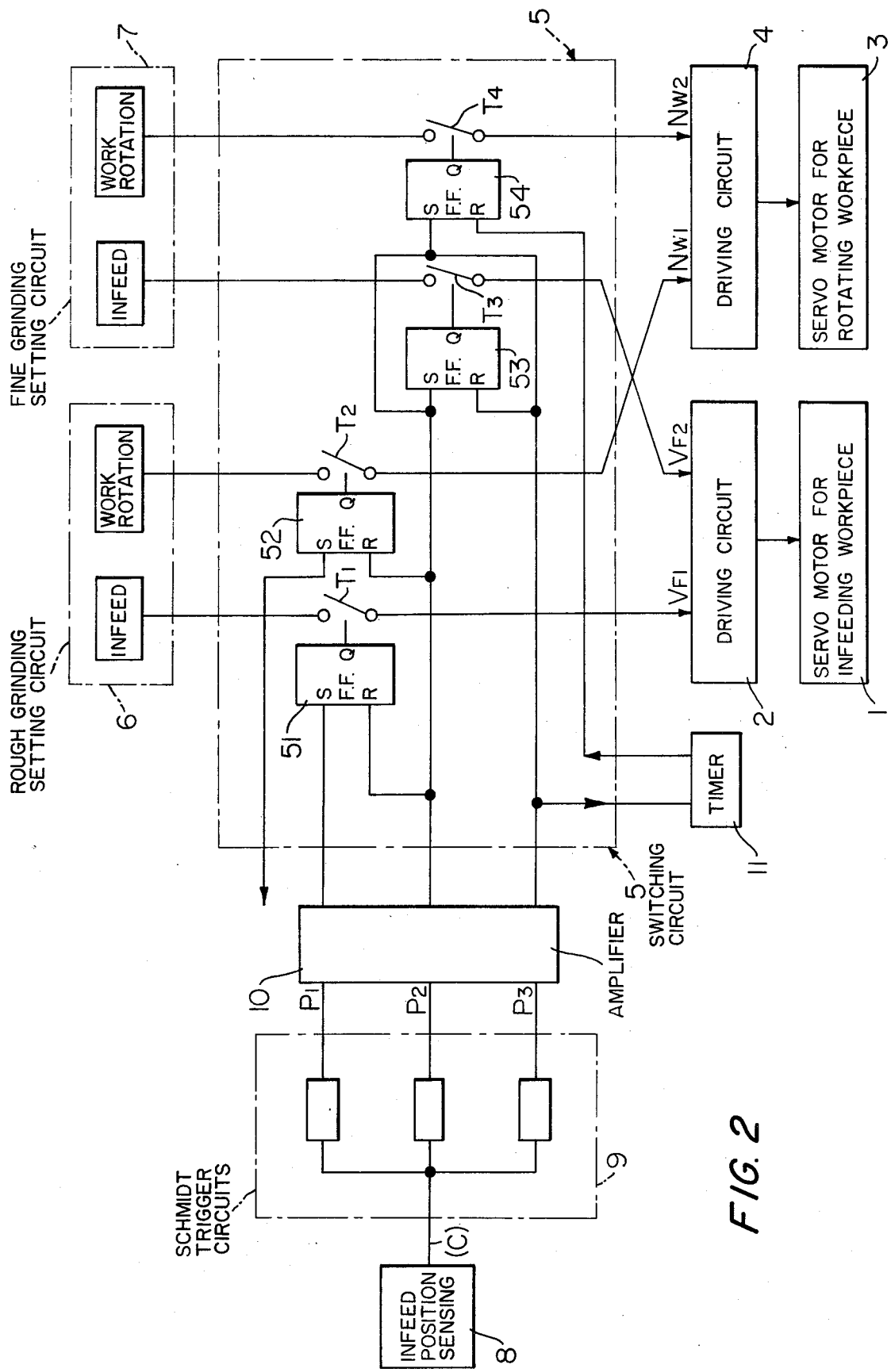
FIG. 2 is a block diagram showing an embodiment of the invention.

FIG. 2 is a block diagram showing an embodiment of the invention, in which numeral 1 designates a servo-motor for infeeding a workpiece toward a grinding wheel, servomotor 1 being controlled by a driving circuit 2, and numeral 3 designates a motor for driving the workpiece to rotate, motor 3 being controlled by a driving circuit 4. Driving circuits 2 and 4 receive set-up signals respectively from a rough infeed amount setting circuit 6 and a fine infeed amount setting circuit 7 through a switching circuit 5.

Rough infeed amount setting circuit 6 sets a speed $V_{F_1}$ for servo-motor 1 and a speed $N_{W_1}$ for motor 3, in this working condition surface roughness of the workpiece being rather poor but metal removal rate and geometric improvement of the workpiece being superior.

Fine infeed amount setting circuit 7 sets a speed $V_{F_2}$ for servo-motor 1 and a speed $N_{W_2}$ for motor 3, in this working condition grinding efficiency being rather poor but superior surface roughness being attained. Numeral 8 designates an infeed table position determining device. The output signal of infeed table position determining device 8 is fed to Schmidt trigger circuits 9.

One of Schmidt trigger circuits 9 generates an output signal $P_1$ when the infeed table position becomes equal to a predetermined quick infeed end point. A second of the circuits 9 generates an output signal $P_2$ when the infeed table position becomes equal to a predetermined rough infeed end point, a third of the circuits 9 generating an output signal $P_3$ when the infeed table position becomes equal to a predetermined fine infeed end point. The outputs $P_1$, $P_2$ and $P_3$ are amplified by amplifiers 10 and fed to switching circuit 5.

The output signal $P_1$ of amplifier 10 is fed to the setting terminal S of an R-S flip-flop circuit 51 of setting-preferential type (the following flip-flop circuits are the same types), while the output signal $P_2$ is fed to resetting terminals R of flip-flop circuits 51 and 52 and to setting terminals S of flip-flop circuit 53 and 54, and the output signal $P_3$ is fed to the resetting terminal R of flip-flop circuit 53 and to the setting terminal S of flip-flop circuit 54. Output terminals Q of flip-flop circuits 51, 52, 53 and 54 are respectively connected to the control terminals of well-known electronic switches $T_1$, $T_2$, $T_3$, and $T_4$ e.g. $FET_s$. Electronic switch $T_1$ is connected between the infeed speed value $V_{F_1}$ output terminal (for servomotor 1) of rough infeed amount setting circuit 6 and a control terminal of driving circuit 2 to thereby on-off control the input of infeed speed $V_{F_1}$ to driving circuit 2. Electronic switch $T_2$ is connected between the workpiece revolutional speed value $N_{W_1}$ output terminal of rough infeed amount setting circuit 6 and a control terminal of driving circuit 4 for motor 3, electronic switch $T_3$ is connected between the infeed speed value $V_{F_2}$ output terminal of fine infeed amount setting circuit 7 and a control terminal of driving circuit 2 for servomotor 1, and further, electronic switch $T_4$ is connected between the workpiece revolutional speed value $N_{W_2}$ output terminal of fine infeed amount setting circuit 7 and a control terminal of driving circuit 4. Fourth flip-flop circuit 54 is to receive the output of a timer 11, which gives spark-out time, at the resetting terminal R thereof. Timer 11 is energized to start its operation for generating the output in response to signal $P_3$. Setting terminal of second flip-flop circuit 52 is connected to the cycle-start output terminal of a grinding-cycle control circuit which is not shown in the drawings.

In operation of the above described embodiment, after a workpiece is mounted on the work spindle and the grinding machine is started, at first, a cycle start signal is generated at the grinding cycle control circuit and sets flip-flop circuit 52, making output Q of the flip-flop 52 1-level whereby electronic switch $T_2$ is switched on. Accordingly, workpiece revolution speed value $NW_1$ of rough infeed amount setting circuit 6 is fed to driving circuit 4 to drive motor 3 at revolutional speed $NW_1$. A position signal $P_1$ is fed out from Schmidt trigger circuits 9 to switching circuit 5 when a rapid infeed step is finished and a rough grinding infeed step is now starting as shown in FIG. 1. Signal $P_1$ sets flip-flop 51 to level 1 at the terminal Q, and thereby electronic switch $T_1$ is switched on to connect rough infeed amount setting circuit 6 to driving circuit 2. Accordingly, rough grinding step is carried with a heavier infeed per workpiece revolution, servo-motor driving the infeed table with the rough grinding infeed speed $V_{F_1}$.

Reaching to point $P_2$ in FIG. 2 after rough grinding in the above working condition, Schmidt trigger circuits 9 generates and feeds output signal $P_2$ to switching circuit 5. Signal $P_2$ resets flip-flops 51 and 52 to level 0 at their output terminals Q, and thereby electronic switches $T_1$ and $T_2$ are switched off. At the same time, signal $P_2$ sets flip-flops 53 and 54 to level 1 at their output terminals Q, and thereby electronic switches $T_3$ and $T_4$ are switched on to connect fine infeed amount setting circuit 7 to driving circuit 2 and 4 respectively. Accordingly, driving circuit 2 drives servo-motor 1 at a predetermined fine grinding infeed speed $T_{F_2}$ and driving circuit 4 drives motor 3 at a predetermined fine grinding revolutional speed $N_{W_2}$, whereby the fine grinding on the workpiece proceeds.

When the workpiece diameter reaches the finished size, a position signal $P_3$ is fed out from Schmidt trigger circuit 9 to switching circuit 5, and flip-flop 53 is reset to level 0 at its output terminal Q, electronic switch $T_3$ being switched off. The infeed is accordingly stopped and the spark-out step begins. At this time, timer 11 starts to operate to reset flip-flop 54 after the spark-out step. This resetting causes switching-off of electronic switch $T_4$. On the other hand, on account of the time-up signal of timer 11, i.e. a grinding finish signal, the infeed table, which is not shown in the drawings, is made free from its driving mechanism including servo-motor 1 and is returned back by spring force.

Figure 3:
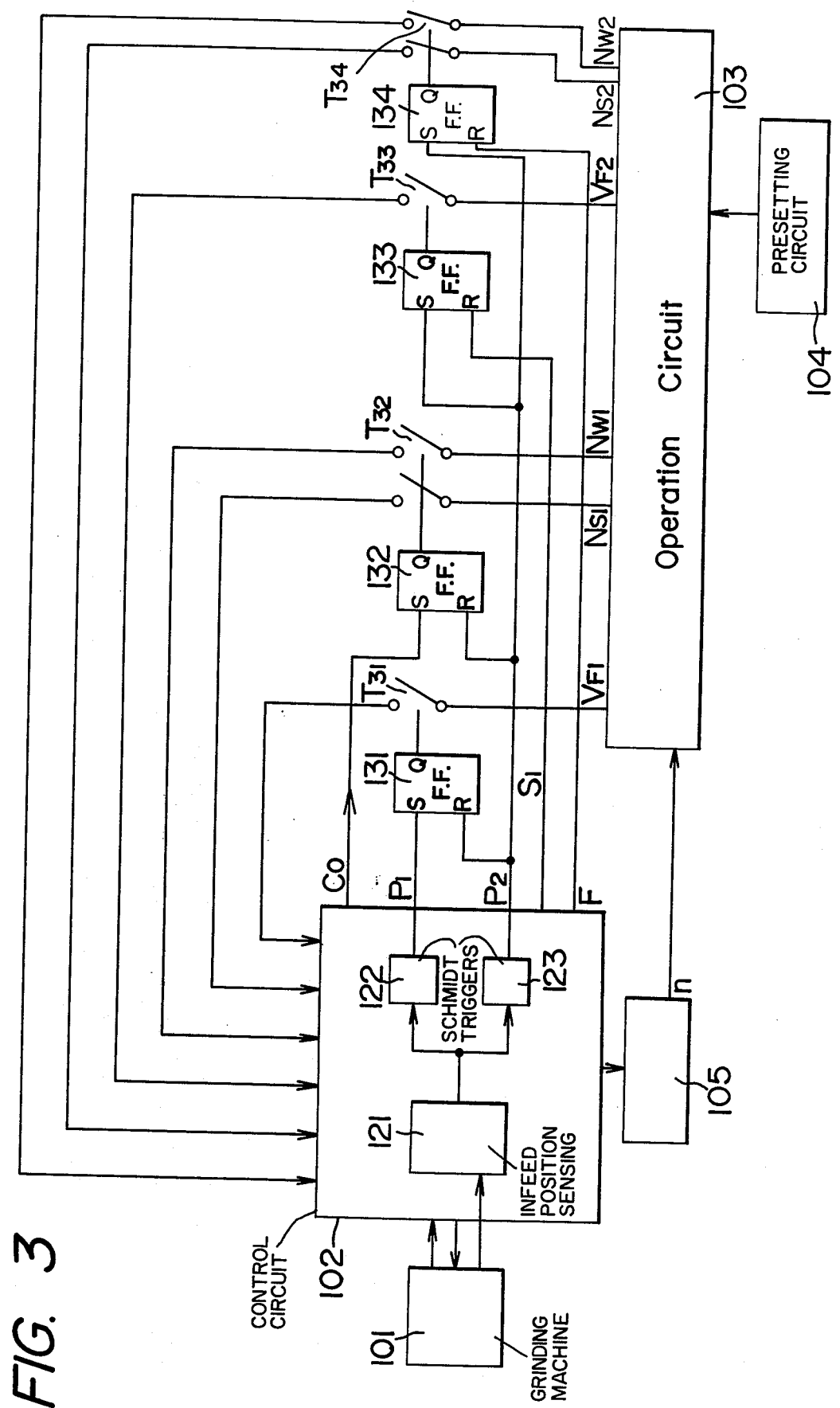
FIG. 3 is a block diagram showing another embodiment of the invention.

FIG. 3 shows another embodiment according to the invention, in which reference marks $P_1$, $P_2$, $V_F$ and $N_W$ are used as the same meanings in FIG. 2.

This embodiment of FIG. 3 eliminates the bad influence of grinding wheel surface speed decreasing due to dressing operations, which shifts the ratio $K_V$.

Numeral 101 in FIG. 3 designates a cylindrical or internal grinding machine controlled in a predetermined process by a control circuit 102.

Numeral 103 designates an operation circuit which computes workpiece revolution speed $N_W$, grinding wheel revolution speed $N_S$ and infeed speed $V_F$ applicable to keeping the ratio $K_V$ and the infeed rate $\Delta$ optimum for rough or fine grinding. Presetting circuit 104 is provided and has optimum values of the ratio $K_{V_1}$ and the infeed rate $\Delta_1$ for rough grinding, and of the ratio $K_{V_1}$ and the infeed rate $\Delta_2$ for fine grinding, the grinding wheel diameter $D_S$, the initial value of the wheel diameter $D_O$, the workpiece diameter to be worked $D_W$, and a dressing infeed depth C preset for supplying them to operation circuit 103.

A Schmidt trigger circuit 122 is triggered to generate signal $P_1$ when applied a signal corresponding to the rough grinding starting position from position determining device 121, while the other Schmidt trigger circuit 123 generates signal $P_2$ when the infeed table is located to change to the fine infeed from the rough infeed. Signal $P_1$ is fed to the setting terminal S of flip-flop circuit 131, and signal $P_2$ is fed to the resetting terminal R of flip-flop circuits 131 and 132 and further to the setting terminals S of flip-flop circuits 133 and 134, similarly to the former embodiment.

The setting terminal of flip-flop 132 is connected to the output terminal $C_O$ of grinding cycle starting signal on control circuit 102, and the resetting terminal R of flip-flop 133 is connected to the size-up or spark-out signal terminal $S_1$ on control circuit 102, and further, the resetting terminal R of flip-flop 134 is connected to the finish size signal terminal F.

The output Q of flip-flop 131 controls an electronic switch $T_{31}$ to switch on-and-off the conductive lines from the output terminal $V_{F_1}$ of operation circuit for rough infeed to control circuit 102, the output Q of flip-flop 132 controls an electronic switch $T_{32}$ to switch on-and-off the lines from the output terminal $N_{S_1}$ for grinding wheel revolution and the output terminal $N_{W_1}$ for workpiece revolution of rough grinding to the corresponding terminals of control circuit 102. The output terminal Q of flip-flop 133 controls an electronic switch $T_{33}$ to switch on-and-off the lines from the output terminal $V_{F_2}$ of the operation circuit 103 for fine infeed to the corresponding terminal of control circuit 102, and further, the output Q of flip-flop 134 controls an electronic switching circuit $T_{34}$ to switch on-and-off the lines from the output terminal $N_{S_2}$ for grinding wheel revolution and the output terminal $N_{W_2}$ for workpiece revolution of fine grinding to the corresponding terminals of control circuit 102.

Operation circuit 103 is to receive dressing number signal $n$ from a dressing number detecting circuit 105 which includes a skip counter operated by every predetermined number of workpiece grindings or a detector to detect over power consumption of the wheel spindle motor caused by excessive grinding force due to the loading of the wheel.

With the signals of dressing number $n$ generated at dressing number detecting circuit 105 and optimum ratios $K_{V_1}$ and $K_{V_2}$, optimum infeed rates $\Delta_1$ and $\Delta_2$, initial wheel diameter $D_O$, workpiece diameter $D_w$, wheel revolution speeds $N_W$, and dressing amount C preset at presetting circuit 104, the output signals of most suitable workpiece revolution speeds $N_{W_1}$ and $N_{W_2}$, wheel revolution speeds $N_{S_1}$ and $N_{S_2}$ and infeed speeds $V_{F_1}$ and $V_{F_2}$ are computed out in operation circuit 103. These output signals are selectively fed to the control circuit in response to the select signals $P_1$, $P_2$, $C_O$ and F which have been described above, for controlling grinding machine 101.

More particularly describing, the diameter $D_S$ of the grinding wheel on working is given as, $$D_S = D_O - nC$$

and, infeed speeds $V_{F_i}$ for rough and fine grinding are given as, $$V_{F_i} = N_{W_i}\Delta_i/60 \ldots (i = 1 \text{ or } 2)$$

and further, the operation of formula $$N_{W_i} = N_{S_i} K_{V_i} D_S / D_W$$

is carried for getting outputs $V_{F_i}$ and $N_{W_i}$, outputs $N_{S_i}$ being directly set at the corresponding terminals.

Operation of this embodiment is similar to the former in FIG. 2, cycle start signal $C_O$ serving to set the revolution speeds of the workpiece and the grinding wheel respectively to $N_{W_1}$ and $N_{S_1}$, infeed position signal $P_1$ serving to set the infeed speed of the infeed table to $V_{F_1}$, and infeed position signal $P_2$ serving to set the infeed speed and the revolution speeds of the workpiece and the wheel respectively to $V_{F_2}$, $N_{W_2}$ and $N_{S_2}$.

When dressing number signal $n$ is fed to operation circuit 103, wheel diameter value $D_S$ is corrected with the above described formula, and accordingly workpiece revolution values $N_{W_1}$ and $N_{W_2}$ and infeed speed values $V_{F_1}$ and $V_{F_2}$ are all changed for maintaining given $K_{V_1}$, $K_{V_2}$, $\Delta_1$ and $\Delta_2$.

Therefore, regardless of the wheel diameter decreasing due to dressing operation, grinding operation is proceeded in optimum working condition.

It is to be noted that modification and variation may be made in the invention. For instance, instead of grinding wheel revolution speeds, workpiece revolution speeds $N_{W_1}$ and $N_{W_2}$ may be preset for computing wheel revolution speed values with them in operation circuit 103 or grinding wheel surface speeds for rough and fine grindings may be preset for computing the sames $N_{S_1}$ and $N_{S_2}$ and workpiece revolution speeds $N_{W_1}$ and $N_{W_2}$. It may also be available to the invention that electronic switches are connected between operation circuit 103 and presetting circuit 104, not to the output side of operation circuit 103.

Further, in case of ordinary internal grinders which do not operate spark-out as is shown in FIG. 1, flip-flop 133 should be removed and electronic switch $T_{33}$ should be operated simultaneously with switch $T_{34}$.

The result of experiments of grinding method according to this invention we have done is shown in the tables 1 and 2, in reference to the conventional method of constant workpiece revolution.

In each of these experiments, equal workpieces, the same grinding machine, the same grinding wheel and the same grinding conditions other than what are shown in the table 1 or 2 are used for equitable comparison.

Table 1

| | Conventional | | this invention | |
|---|---|---|---|---|
| | rough grinding | fine grinding | rough grinding | fine grinding |
| Workpiece revolution speed $N_W$ | 2,380 R.P.M. | | 3,360 R.P.M. | 960 R.P.M. |
| infeed speed $V_F$ | 35 μm/sec | 5 μm/sec | 59 μm/sec | 3.2 μm/sec |
| cylindricity | ±1.5 μm | | ±1.0 μm | |
| surface roughness | 1.8 μm $R_{max}$ | | 1.2 μ $R_{max}$ | |
| diameter range | 4 μm | | 3 μm | |
| net working time | 9.2 sec. | | 5.7 sec. | |

Table 2

| | Conventional | | this invention | |
|---|---|---|---|---|
| | rough grinding | fine grinding | rough grinding | fine grinding |
| Workpiece revolution speed $N_W$ | 3,750 R.P.M. | | 4,500 R.P.M. (for initial wheel diameter) | 1,500 R.P.M. |
| infeed speed $V_F$ | 40 μm/sec | 5 μm/sec | 59 μm/sec | 3.2 μm/sec |
| cylindricity | ±1.5 μm | | ±0.5 μm | |
| surface roughness | 1.5 μm $R_{max}$ | | 1.2 μm $R_{max}$ | |
| diameter range | 4 μm | | 2 μm | |
| net working time | 7.1 sec. | | 4.8 sec. | |

For signal $P_3$ of the above described embodiment, a size signal $P_3$ from the improcess sizing device of the grinder is more preferably substituted for the purpose of obtaining more accurate finish size.

What is claimed is:

1. A method for controlling the grinding of a rotating workpiece by a grinding machine having a driven work spindle and a grinding wheel which comprises:

mounting said workpiece on said work spindle and starting the grinding machine, effecting a rapid infeed of the grinding wheel to the workpiece, rotating the workpiece and the grinding wheel at first preset speeds while infeeding the grinding wheel to the workpiece at a preset rate per workpiece revolution to effect a predetermined rough grinding of the workpiece, and thereafter rotating the workpiece and the grinding wheel at second separately preset speeds different from said first present speeds while infeeding the grinding wheel to the workpiece at a preset lower rate per workpiece revolution to effect a predetermined fine grinding of the workpiece.

2. A method according to claim 1, wherein said rotation speeds and infeed rates respectively are preset in a presetting circuit.

3. A method according to claim 2, wherein the workpiece diameter and grinding wheel diameter are preset and stored in said presetting circuit for computing said rotation speeds and infeed rates.

4. A method according to claim 3, wherein said grinding wheel is dressed from time to time and wherein said stored grinding wheel diameter value is corrected according to the dressing number and dressing infeed depth.

* * * * *